United States Patent
Zhang et al.

(10) Patent No.: US 9,699,116 B2
(45) Date of Patent: Jul. 4, 2017

(54) SDN BASED INTERDOMAIN AND INTRADOMAIN TRAFFIC ENGINEERING

(71) Applicant: Telefonaktiebolaget L M Ericsson (publ), Stockholm (SE)

(72) Inventors: Ying Zhang, Fremont, CA (US); Mehrdad Moradi, San Jose, CA (US)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 180 days.

(21) Appl. No.: 14/605,867

(22) Filed: Jan. 26, 2015

(65) Prior Publication Data
US 2016/0218917 A1    Jul. 28, 2016

(51) Int. Cl.
| | | |
|---|---|---|
| *H04L 12/24* | (2006.01) | |
| *H04L 12/931* | (2013.01) | |
| *H04L 12/717* | (2013.01) | |
| *H04L 12/815* | (2013.01) | |
| *H04L 12/715* | (2013.01) | |
| *H04L 12/751* | (2013.01) | |

(52) U.S. Cl.
CPC ............. *H04L 49/35* (2013.01); *H04L 45/42* (2013.01); *H04L 45/02* (2013.01); *H04L 45/04* (2013.01); *H04L 45/46* (2013.01); *H04L 47/22* (2013.01)

(58) Field of Classification Search
CPC ....... H04L 45/02; H04L 12/24; H04L 12/723; H04L 12/707
USPC .......................................................... 370/254
See application file for complete search history.

(56) References Cited

U.S. PATENT DOCUMENTS

| | | | | |
|---|---|---|---|---|
| 7,581,022 B1* | 8/2009 | Griffin | ............. | H04L 45/04 370/238 |
| 7,904,586 B1* | 3/2011 | Griffin | ............. | H04L 45/00 709/238 |
| 8,693,374 B1* | 4/2014 | Murphy | ............. | H04L 12/28 370/255 |
| 2006/0126630 A1* | 6/2006 | Shirazipour | ........ | H04L 12/4633 370/392 |

(Continued)

OTHER PUBLICATIONS

"Openflow Switch Specification", http://www.openflow.org/wk/index.php/OpenFlow_v1.1.

(Continued)

*Primary Examiner* — Edan Orgad
*Assistant Examiner* — Emmanuel Maglo
(74) *Attorney, Agent, or Firm* — Nicholson, De Vos, Webster & Elliot, LLP

(57) ABSTRACT

A method is implemented by a centralized control plane device for a software defined networking (SDN) network. The method performs joint inter-domain and intra-domain traffic engineering as a single optimization process with location varying objectives. The method includes generating a joint representation of interdomain and intradomain traffic demand with spatial differentiation where each domain can have individually defined optimization objectives. The method further includes determining a set of candidate paths for each source-destination pairs (SD) in the SDN network using the joint representation, selecting a candidate path from the set of candidate paths for each SD pair in the SDN network, and programming a set of switches in the data plane of the SDN network to forward the data traffic according to the selected candidate path.

15 Claims, 10 Drawing Sheets

(56) References Cited

U.S. PATENT DOCUMENTS

| | | | | |
|---|---|---|---|---|
| 2011/0090791 | A1* | 4/2011 | Udupi | H04L 45/04 370/231 |
| 2011/0271007 | A1* | 11/2011 | Wang | H04L 45/306 709/238 |
| 2013/0034104 | A1* | 2/2013 | Yedavalli | H04L 41/12 370/400 |
| 2013/0250770 | A1* | 9/2013 | Zou | H04L 47/19 370/238 |
| 2014/0149542 | A1* | 5/2014 | Luo | H04L 45/02 709/217 |
| 2014/0185450 | A1* | 7/2014 | Luo | H04L 45/42 370/236 |
| 2014/0229944 | A1* | 8/2014 | Wang | G06F 9/5088 718/1 |
| 2014/0362790 | A1* | 12/2014 | McCann | H04W 40/248 370/329 |
| 2015/0016286 | A1* | 1/2015 | Ganichev | H04L 45/586 370/252 |
| 2015/0103659 | A1* | 4/2015 | Iles | H04L 47/11 370/235 |
| 2015/0117202 | A1* | 4/2015 | Bhagavathiperumal | H04L 47/10 370/235 |

OTHER PUBLICATIONS

Caesar, Matthew, et al., "Design and Implementation of a Routing Control Platform", NSDI 2005; 14 pages.

Farrel, A., et al., "A Path Computation Element (PCE)-Based Architecture", *Network Working Group*; RFC 4655; Aug. 2006; 40 pages.

Gupta, Arpit, et al., "SDX: A Software Defined Internet Exchange", *SIGCOMM* 2014; 12 pages.

McKeown, Nick, et al., "Openflow: enabling innovation in campus networks", *SIGCOMM CCR*: vol. 38, No. 2, Apr. 2008; pp. 69-74.

Wang, Hao, et al., "COPE: Traffic Engineering in Dynamic Networks", *SIGCOMM* 2006; 12 pages.

Ali, Z., et al., "Node-IDS Based Resource Reservation Protocol (RSVP) Hello: A Clarification Statement", Network Working Group; RFC 4558; Jun. 2006; 7 pages.

Andersson, L., et al., "LDP Specification", Network Working Group; RFC 5036; Oct. 2007; 135 pages.

Awduche, D., et al., "RSVP-TE: Extensions to RSVP for LSP Tunnels,", Network Working Group; RFC 3209; Dec. 2001; 61 pages.

Babiarz, J, et al., "Configuration Guidelines for DiffServ Service Classes", Network Working Group; RFC 4594; Aug. 2006; 57 pages.

Baker, F., "A Differentiated Services Code Point (DSCP) for Capacity-Admitted Traffic", Internet Engineering Task Force (IETF), Request for Comments: 5865, IETF Trust, (May 2010), 14 pages.

Baker, F., et al., "Management Information Base for the Differentiated Services Architecture", Network Working Group, Request for Comment: 3289, May 2002, 116 pages.

Berger, L., "Generalized Multi-Protocol Label Switching (GMPLS) Signaling Resource ReserVation Protocol-Traffic Engineering (RSVP-TE)", Network Working Group; RFC 3473; Jan. 2003; 42 pages.

Bernet, Y. , et al., "An Informal Management Model for Diffserv Routers", Network Working Group; RFC 3290; May 2002; 56 pages.

Black, D., "Differentiated Services and Tunnels", Network Working Group; RFC 2983; Oct. 2000; 14 pages.

Black, D., et al., "Per Hop Behavior Identification Codes", Network Working Group; RFC 3140; Jun. 2001; 8 pages.

Blake, S., et al., "An Architecture for Differentiated Services", Network Working Group; RFC 2475; Dec. 1998; 36 pages.

Borman, D., et al., "IPv6 Jumbograms", Network Working Group, Request for Comments: 2675, Aug. 1999, 9 pages.

Braden, R. , et al., "Resource ReSerVation Protocol (RSVP) Version 1 Functional Specification", Network Working Group, Request for Comment: 2205, Sep. 1997, 112 pages.

Chan, K., et al., "Differentiated Services Quality of Service Policy Information Base", Network Working Group; RFC 3317; Mar. 2003; 96 pages.

Charny, A., et al., "Supplemental Information for the New Definition of the EF PHB (Expedited Forwarding Per-Hop Behavior)", Network Working Group; RFC 3247; Mar. 2002; 24 pages.

Coltun, R., et al., "OSPF for IPv6", Network Working Group, Request for Comment: 5340, Jul. 2008, 94 pages.

Davie, B., et al., "An Expedited Forwarding PHB (Per-Hop Behavior)," Mar. 2002, 16 pages, Network Working Group, Request for Comments: 3246, The Internet Society.

Deering, S., et al., "Internet Protocol, Version 6 (IPv6) Specification", Network Working Group, Request for Comments: 2460, Dec. 1998, 39 pages.

Eggert, L., et al., "Unicast UDP Usage guidelines for Application Designers", Network Working Group; RFC 5405; Nov. 2008; 27 pages.

Fenner, B., et al., "Management Information Base for the User Datagram Protocol (UDP)", Network Working Group; RFC 4113; Jun. 2005; 19 pages.

Grossman, D., "New Terminology and Clarifications for Diffserv", Network Working Group; RFC 3260; Apr. 2002; 10 pages.

Heinanen, J., et al., "Assured Forwarding PHB Group", Network Working Group; RFC 2597; Jun. 1999; 11 pages.

Hendrick, C., "Routing Information Protocol", Network Working Group, Request for Comment: 1058, Jun. 1988, 33 pages.

Hopps, C., "Analysis of an Equal-Cost Multi-Path Algorithm", Network Working Group; RFC 2992; Nov. 2000; 8 pages.

Housley, R., et al., "Using Advanced Encryption Standard (AES) CCM Mode with IPsec Encapsulating Security Payload (ESP)", Network Working Group; RFC 4309; Dec. 2005; 13 pages.

Information Sciences Institute, University of Southern C., "Transmission control protocol darpa Internet program protocol specification", Sep. 1981, RFC: 793, 91 pages.

Kent, S., et al., "Security Architecture for the Internet Protocol", Network Working Group; RFC 4301; Dec. 2005; 101 pages.

Kompella, K., et al., "Procedures for Modifying the Resource reSerVation Protocol (RSVP)", Network Working Group; RFC 3936; Oct. 2004; 7 pages.

Malkin, G., at al., "RIP Version 2", Network Working Group; RFC 2453; Nov. 1998; 39 pages.

Malkin, G., et al., "RIPng for IPv6", Network Working Group; RFC 2080; Jan. 1997; 19 pages.

Moy, J., "OSPF Version 2", Network Working Group, Request for Comments: 2328, Apr. 1998, 244 pages.

Nichols, K., et al., "Definition of the Differentiated Services Field (DS Field) in the IPv4 and IPv6 Headers," Dec. 1998, 20 pages, Network Working Group, Request for Comments: 2474, The Internet Society.

Nichols, K., et al., "Definition of Differentiated Services Per Domain Behaviors and Rules for their Specification", Network Working Group; RFC 3086; Apr. 2001; 24 pages.

Oran, D., "OSI ISIS Intradomain Routing Protocol", Network Working Group, Request for Comments: 1142, (Feb. 1990), 157 pages.

Polk, J., et al., "A Resource Reservation Protocol (RSVP) Extension for the Reduction of Bandwidth of a Reservation Flow", Network Working Group; RFC 4495; May 2006; 21 pages.

Postel, J., "User Datagram Protocol", Aug. 28, 1980, 3 pages, RFC 768.

Rekhter, Y., et al., "A Border Gateway Protocol 4 (BGP-4)", Network Working Group; RFC 4271; Jan. 2006; 104 pages.

Rosen, E., et al., "BGP/MPLS IP Virtual Private Networks (VPNs)", Network Working Group, Request for Comment: 4364, Feb. 2006, 47 pages.

Shenker, S., et al., "Specification of Guaranteed Quality of Services", Network Working Group; RFC 2212; Sep. 1997; 20 pages.

Socolofsky, T., et al., "A TCP/IP Tutorial", Network Working Group; RFC 1180; Jan. 1991; 28 pages.

(56) References Cited

OTHER PUBLICATIONS

Thaler, D., et al., "Multipath Issues in Unicast and Multicast Next-Hop Selection", Network Working Group; RFC 2991; Nov. 2000; 9 pages.

Wroclawski, J., "Specification of the Controlled-Load Network Element Service", Network Working Group; RFC 2211; Sep. 1997; 19 pages.

Wroclawski, J., "The Use of RSVP with IETF Integrated Services", Network Working Group; RFC 2210; Sep. 1997; 33 pages.

* cited by examiner

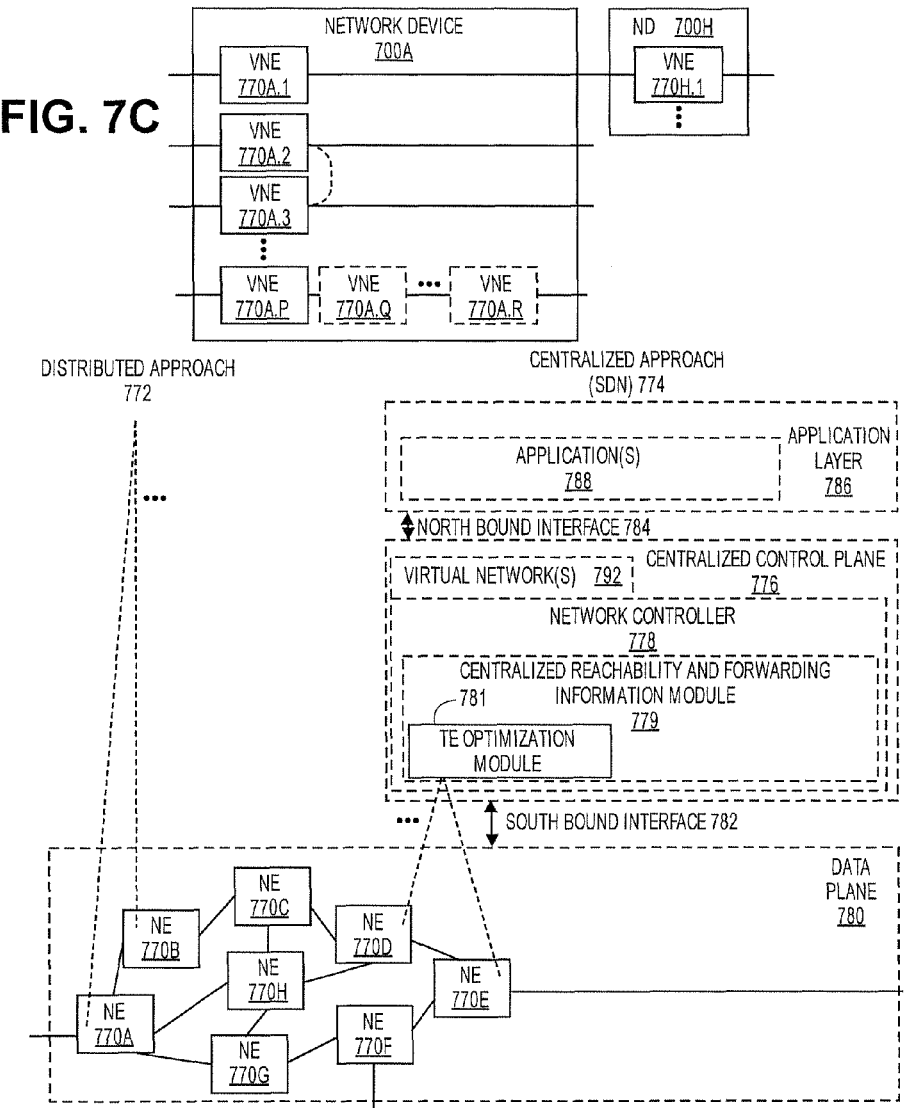
FIG. 7C
FIG. 7D
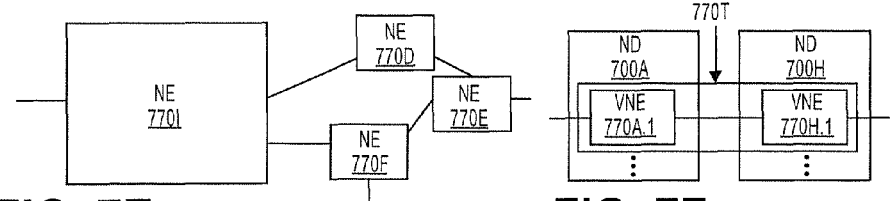
FIG. 7E
FIG. 7F

SDN BASED INTERDOMAIN AND INTRADOMAIN TRAFFIC ENGINEERING

FIELD

Embodiments of the invention relate to the field of traffic engineering; and more specifically, to traffic engineering in a software defined networking (SDN) network that generates a joint representation of interdomain and intradomain traffic engineering and supports differing optimization objectives where the process can be recursively implemented to enable the traffic engineering to scale.

BACKGROUND

In standard network architectures, the nodes within a domain implement interior gateway protocols and determine paths between the nodes of the domain including those gateways that enable addresses outside to the domain to be reached. Optimizing and managing this domain specific path finding and selection can be referred to as intradomain traffic engineering. Optimizing and managing path finding across multiple domains in contrast is referred to as interdomain traffic engineering.

Traffic engineering is an important problem in network management that selects paths between nodes to efficiently utilize the network resources. There are a number of traffic engineering algorithms that have been proposed and/or employed to separately or individually manage intradomain traffic engineering. Many of these traffic engineering algorithms are related to multi-protocol label switching (MPLS) based traffic engineering. These traffic engineering algorithms compute the optimal path assignment given the historical traffic matrix. Another simpler approach is to use an oblivious routing, where the path is computed based on the worst-case performance overall using a traffic matrix.

Interdomain traffic engineering is the management and selection of paths across domains. In large networks, network operators usually build a hierarchy of route reflectors to reduce the management overhead and the difficulties with configuration of large border gateway protocol (BGP) meshes. In general, route reflectors choose the best BGP routes, and advertise their client routers. The main challenge is that routers along a single path might receive different paths as their reflectors have a limited and local view. This problem is known to create inconsistency and oscillation in the configuration of forwarding tables in the networks, so operators try to only deploy a handful of route reflectors and provide a kind of consistency among them. An example is the route control platform (RCP), which is a centralized node that selects the best BGP route on behalf of all routers in an associated domain or autonomous system (AS). Then routers in the network can combine interior gateway protocol (IGP) and BGP data to build their forwarding information bases (FIBs). However, RCP does not enable differing optimization objectives and does not provide a systematic approach for interdomain TE. Existing primitives for interdomain TE include setting route attributes, AS number prepending, route aggregation and deaggregation.

SUMMARY

A method implemented by a centralized control plane device for a software defined networking (SDN) network. The method performs joint inter-domain and intra-domain traffic engineering as a single optimization process with location varying objectives. The method includes generating a joint representation of interdomain and intradomain traffic demand with spatial differentiation where each domain can have individually defined optimization objectives. The method further includes determining a set of candidate paths for each source-destination pairs (SD) in the SDN network using the joint representation, selecting a candidate path from the set of candidate paths for each SD pair in the SDN network, and programming a set of switches in the data plane of the SDN network to forward the data traffic according to the selected candidate path.

A further embodiment provides a control plane device for a software defined networking (SDN) network. The control plane device is configured to execute a method to perform joint inter-domain and intra-domain traffic engineering as a single optimization process with location varying objectives. The control plane device includes a non-transitory machine readable medium having stored therein a traffic engineering (TE) optimization module, and a processor communicatively coupled to the non-transitory machine readable medium. The processor is configured to execute the TE optimization module. The TE optimization module is configure to generate a joint representation of interdomain and intradomain traffic demand with spatial differentiation where each domain can have individually defined optimization objectives, to determine a set of candidate paths for each source-destination pairs (SD) in the SDN network using the joint representation, to select a candidate path from the set of candidate paths for each SD pair in the SDN network, and to program a set of switches in the data plane of the SDN network to forward the data traffic according to the selected candidate path.

Another embodiment provides a computing device for a software defined networking (SDN) network. The computing device is configured to execute a plurality of virtual machines, at least one of the plurality of virtual machines to implement a method to perform joint inter-domain and intra-domain traffic engineering as a single optimization process with location varying objectives. The computing device includes a non-transitory machine readable medium having stored therein a traffic engineering (TE) optimization module, and a processor communicatively coupled to the non-transitory machine readable medium. The processor is configured to execute the at least one virtual machine. The at least one virtual machine implements the TE optimization module. The TE optimization module is configured to generate a joint representation of interdomain and intradomain traffic demand with spatial differentiation where each domain can have individually defined optimization objectives, to determine a set of candidate paths for each source-destination pairs (SD) in the SDN network using the joint representation, to select a candidate path from the set of candidate paths for each SD pair in the SDN network, and to program a set of switches in the data plane of the SDN network to forward the data traffic according to the selected candidate path.

BRIEF DESCRIPTION OF THE DRAWINGS

The invention may best be understood by referring to the following description and accompanying drawings that are used to illustrate embodiments of the invention. In the drawings:

FIG. 7C illustrates various exemplary ways in which virtual network elements (VNEs) may be coupled according to some embodiments of the invention.

FIG. 7D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 7E illustrates the simple case of where each of the NDs implements a single NE, but a centralized control plane has abstracted multiple of the NEs in different NDs into (to represent) a single NE in one of the virtual network(s), according to some embodiments of the invention.

FIG. 7F illustrates a case where multiple VNEs are implemented on different NDs and are coupled to each other, and where a centralized control plane has abstracted these multiple VNEs such that they appear as a single VNE within one of the virtual networks, according to some embodiments of the invention.

DESCRIPTION OF EMBODIMENTS

Figure 1:
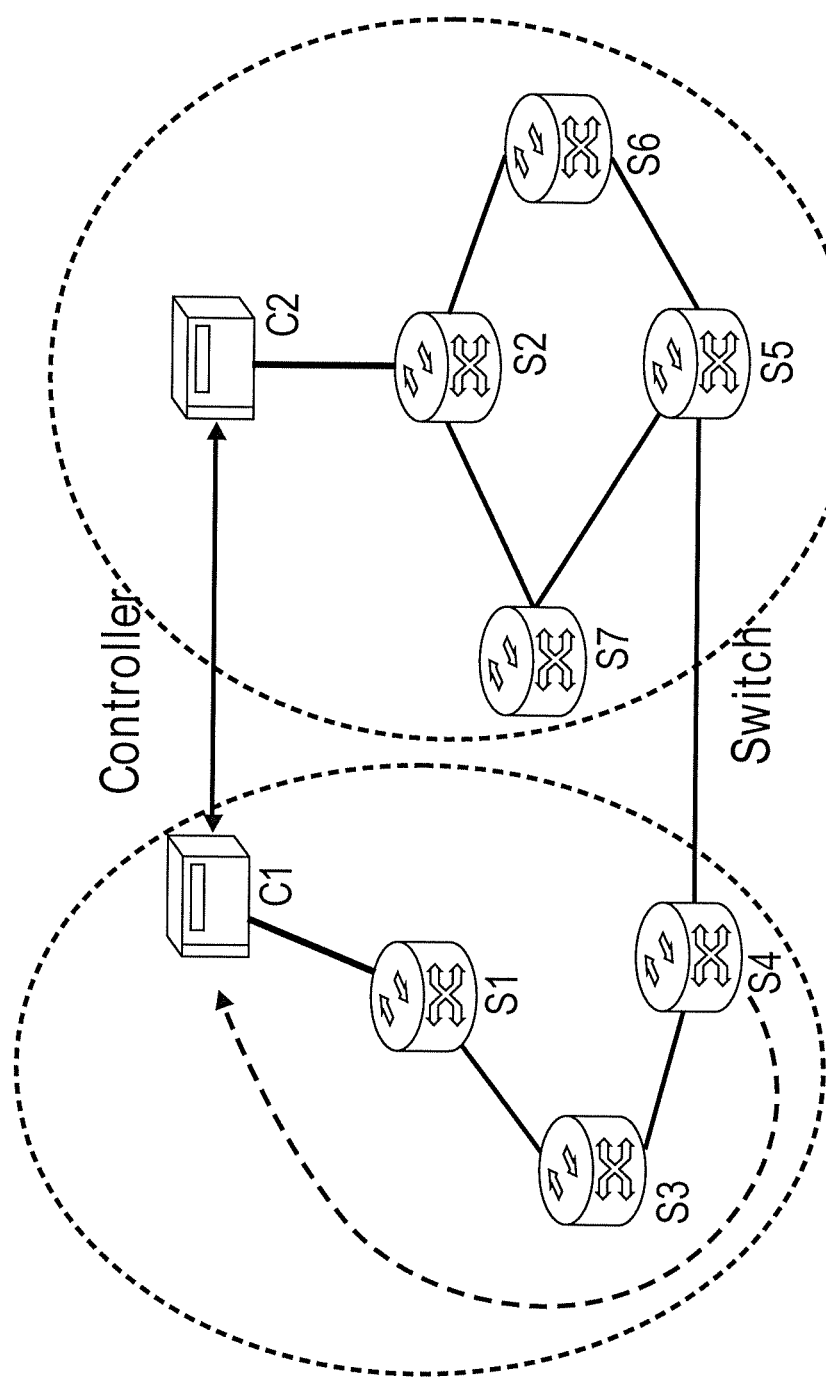
FIG. 1 is a diagram of one embodiment of a software defined network.

The following description describes methods and apparatus to be implement in a software defined network (SDN), the methods and apparatus to perform joint interdomain and intradomain traffic engineering as a single optimization process with location varying objectives. The optimization processes can be recursively executed to improve scalability while in the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate, or interact with each other. "Connected" is used to indicate the establishment of communication between two or more elements that are coupled with each other.

SDN Based Traffic Engineering

A software defined network (SDN) is a network architecture where the control plane is decoupled from the forwarding plane and the entire routing process is built as a distributed system. An SDN contains a network-wide control platform, running on one or more servers in the network, overseeing a set of simple switches. Traditional router architecture follows an integrated design where the control plane and data plane or forwarding engine are tightly coupled in the same box, which usually results in overly complicated control plane and complex network management. Due to high complexity, equipment vendors and network operators are reluctant to employ changes and the network itself is fragile and hard to manage. This is known to create a large burden and presents high barrier to the implementation of new protocols and technology developments, because the old architecture is likely to require extensive replacement of network devices with new network devices that support the new protocols and technologies.

In contrast, the SDN network comprises multiple forwarding elements, i.e., switches, interconnecting with each other and a small number of controllers that instruct the switches' forwarding behavior. These forwarding elements can be programmed to implement any forwarding protocols by the centralized control plane and therefore do not require extensive support for a control plane. The main task of a forwarding element, or a switch, is to forward packets from an ingress port to an egress port, according to the rules in the flow table programmed by the remote controller. Each flow entry contains a set of actions such as forwarding packets to a given port, modifying certain bits in the packet header, encapsulating packets to the controller, or simply dropping the packets. For the first packet in a new flow, the switch normally forwards the packet to the controller to be analyzed and then to trigger the new flow entry being programmed into the receiving switch. Encapsulation can also be used to forward all slow-path packets to a controller for processing such as Internet control message protocol (ICMP) packets. The concept of a flow can be defined broadly, e.g., a transmission control protocol (TCP) connection, or all traffic from a particular media access control (MAC) address or Internet Protocol (IP) address.

The controller in an SDN network adds and removes flow-entries from the flow table. It defines the interconnection and routing among the set of data plane switches. It also handles network state distribution, such as collecting information from the switches and distributing routing instructions to them. It can also be programmed to support any new addressing, routing, and complex packet processing applications. The controller is the "brain" of the network. A switch needs to connect to at least one controller to function correctly.

FIG. 1 is a diagram of one embodiment of a software defined network. A simple network topology that consists of two controllers and a set of switches is illustrated in FIG. 1. In this example, when switch S4 receives a new flow without knowing where to send the packet, S4 forwards the packet to the controller (the dashed line). Upon receiving the packet, controller C1 programs a new routing entry on S4. Thereafter, the packets that are a part of that flow at S4 can be matched with a programmed flow table entry that will define the actions to apply to those packets as programmed by the controller. The actions can include forwarding to a next hop or other packet processing.

SDN Based Interdomain Innovations

The Software Defined Exchangepoint (SDX) is a system that aims to change IXPs where multiple large networks meet to exchange traffic. Existing IXPs have a layer two architecture consisting of a single switch, and a route server (RS). The route server collects the routes advertised by each participant router, and then selects the best one per prefix on behalf of a participant, and finally advertises it by taking into account export policies.

The embodiments of the invention, provide benefits over the prior art that enable improved routing that is scalable for large networks in particular those distributed over large geographic areas. The embodiments provide a process that creates a unified network topology and formulates the interdomain and intradomain traffic engineering (TE) together as a single optimization problem. The embodiments provide a general framework that can incorporate multiple optimization objectives. In some embodiments, a linear programming method is denied to solve the multiple optimization objective problem.

Further, the embodiments provide support for spatial difference in TE objectives. For example, the embodiments can maximize the link utilization of the peering links in the interdomain (to maximize profit) while minimizing the maximum link utilization internally (to avoid congestion). The embodiments further generalize this varying optimization objectives support to be TE with location varying objectives, meaning that different parts of the network can have different TE optimization objectives.

In some embodiments, in the intradomain routing, the TE optimization may have multiple constraints other than minimizing the link cost. The embodiments support the incorporation of service chaining. The TE optimization computation can be modified to take the service chains into consideration. In these embodiments, some flows may require a traversal of a specific service chain before they exit the network, thus it is not the simple selection of a route across the domain from an ingress router to an egress router. Rather, the internal path must encompass the service chain as well. In some embodiments, the model of the intradomain includes the service chains as tunnels and consider these service chains as a part of the set of constraints in the optimization for path selection.

In the embodiments of the invention, when jointly considering the interdomain and intradomain TE optimization, the size of the network and the number of the constraints may be large, which could render the optimization computation unsolvable by the standard optimization algorithms. The embodiments of the invention, overcome the limitations of standard optimization algorithms by utilizing a recursive or regressive TE algorithm to solve the scalability challenge. In these embodiments, the larger overall TE optimization problem is divided into subsets of the overall optimization into optimization computations for smaller regions hierarchically. The TE optimization results at the lower layers of the hierarchy are fed to the upper layer TE to further compute and generate the complete optimization solution.

In some embodiments, the TE optimization is executed for one single administrative domain. Each Internet service provider (ISP) can run the TE optimization process independently to maximize its own objective functions; no information needs to be exchanged between the ISPs. Most TE optimization computes the internal path for each flow within its network, herein referred to as intradomain TE optimization. At the same time, each ISP also receives paths to reach the external prefixes via its BGP sessions from different neighbors. Traditionally, BGP is used to select the best path to reach a certain prefix, according to the AS relationship and the AS path length. Assuming an ISP can have multiple possible paths to reach a prefix, how the ISP selects which path to use is called interdomain TE. The interdomain TE can have objective functions to minimize AS level hop count, balance load from peering links, or even minimize the transit cost.

The prior art TE processes consider intradomain TE and interdomain TE as two separate processes. The prior art TE processes first compute the intradomain paths and then select the egress points based on the intradomain paths (e.g., using hot-potato routing). However, in the embodiments of the invention, the process considers intradomain TE and interdomain TE jointly. At the high level, the TE optimization process takes both the intradomain topology, traffic demand, and the interdomain topology, traffic demand as input, and computes the optimal path selection for all source destination pairs. However, blindly applying the TE optimization process on the entire flat topology is not scalable. Therefore, further embodiments provide a recursive/regressive TE optimization process to break down the overall computation and make it manageable.

The recursive/regressive TE optimization process can handle many scenarios including a first scenario where the network is too large so the switches are managed by multiple controllers, each of which is in charge of a subset of the switches in the network. A second scenario is where the network is managed by a single controller, but because the size of the network is too large, the process cannot compute TE optimization in a single run for the entire network. In this case, the process logically creates different "sub-domains" of the network, which is essentially a way to divide the entire network to smaller parts. The TE optimization process then first computes TE optimization results for each "sub-domain," then hierarchically computes the TE optimization results for each higher layer using these results from the lower layers, and finally computes the TE optimization results at the top of the hierarchy for the entire network.

The embodiments of the invention provide advantages over the prior art TE processes. The embodiments provide advantages in terms of scalability, supporting differing spatial TE optimization objectives, and joint intradomain and interdomain TE optimization. With regard to scalability, the embodiments provide a recursive/regressive method for TE computation in a network having a large size. The input to the TE optimization process is the traffic demand for each ingress/egress pair of a domain or AS. The TE optimization process supports multi-path routing, i.e. where there are k paths between any ingress/egress pairs. The output of the TE optimization process is for each link in the network, how much bandwidth will be allocated for which ingress/egress pair. To scale the TE optimization process, the process takes a recursive TE optimization approach. At the high level, a) each subdomain of a hierarchical representation of the overall network first estimates the traffic demand to the next higher level, then b) a TE optimization process runs at the higher level, and outputs the bandwidth allocation for the higher level links, and c) from this higher level of the hierarchy, using the TE optimization results, each subdomain knows the exact input traffic demand from other domains, then each subdomain can execute the intradomain aspect of the TE optimization process to compute its local paths.

The embodiments provide a process that overcomes the difficulty where the subdomain needs to first estimate its traffic demand to the higher level of the hierarchy without running its intradomain TE optimization process. The subdomain cannot run intradomain TE optimization, because the subdomain does not know how much traffic will be sent from other domains. Without running the intradomain TE optimization, the domain does not know exactly how much traffic will be sent out through each egress point. However, conversely, the controller for the domain needs to provide this information to the next higher level of the hierarchy to enable to complete TE optimization process to complete.

Figure 2:
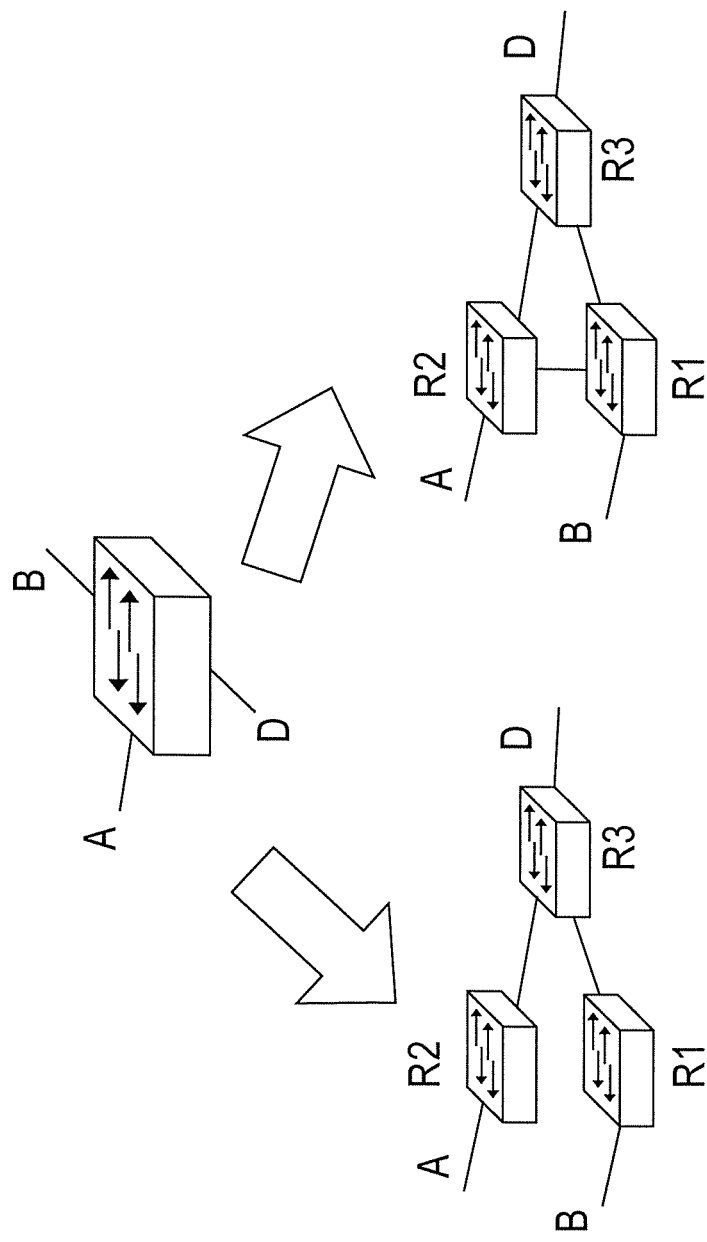
FIG. 2 is a diagram of one example embodiment of an abstracted hierarchical representation of the TE optimization process.

FIG. 2 is a diagram of one example embodiment of an abstracted hierarchical representation of the TE optimization process. The recursive process utilized is illustrated with reference to the example in FIG. 2. In the upper level of the hierarchy that represents the network, there is a single node with three ports. Since there may not be bi-sectional bandwidth between all the ports, the process seeks to expose the available bandwidth to the upper level of the hierarchy between port pairs (A, B), (A, D) and (B, D).

In the bottom left representation in the illustration, there is an example tree topology with two bottleneck links. In the bottom right figure, there is a topology with full bisection bandwidth. When K=1 (i.e. K-shortest path counts between port pairs), the process can expose the available bandwidth between any port pairs in the right figure, but it is more complicated to represent the split of internal bandwidths in the left figure, without running the intradomain TE optimization process first. This is because, some of the bandwidth on link R2-R3, and R1-R3 will be used to handle internal demand (e.g. Traffic from A to B), which does not need to go through the upper level representation of the hierarchy. In this example, when K>=1, the process will lose visibility completely in both figure because 1) the process doesn't know how much traffic the upper level of the hierarchy will be processing and 2) how much traffic will go through internal paths. Thus, to handle these issues the TE optimization process could run a shadow optimization and make a guess, which will be refined over time as the TE optimization process makes further guesses and receives feedback on actual conditions.

As mentioned above, the embodiments of the invention also provide the advantage of supporting spatial differentiation of TE optimization objectives. The multi-objective function of the embodiments is different from the prior art objective optimization. The prior art objective optimization means attempts to achieve max throughput and min delay at the same time, where there are two objectives. However, in the embodiments, the TE optimization process seeks to maximize throughput for peering links while minimizing the max link utilization for internal links. Thus, the embodiments provide a TE optimization process that has different objective functions for different parts (i.e. locations) of the network. In this sense, the TE optimization process is a spatial multi-objective optimization. This is referred to herein as spatial TE or TE with location-varying objectives. This improvement cannot be achieved in the prior art multi-objective optimization processes. For example, it is not possible to maximize throughput and minimize link utilization for all the links at the same time, because these two objectives contradict each other. It only makes sense when the TE optimization process considers these on different parts of the network, which is what the embodiments provide. The embodiments consider the interdomain and intradomain optimization jointly. The embodiments describe the details of the joint representation and optimization herein below.

Joint Formulation of Interdomain and Intradomain TE

As mentioned herein above, the prior art considers interdomain and intradomain routing as two separate processes. There are only limited interactions between the two separate processes. In an SDN, since a centralized controller controls both the interdomain and intradomain routing, this architecture provides the unique opportunity to jointly consider the together. The first contribution of this invention is to consider a joint optimization between interdomain and intradomain traffic engineering.

Figure 3A:
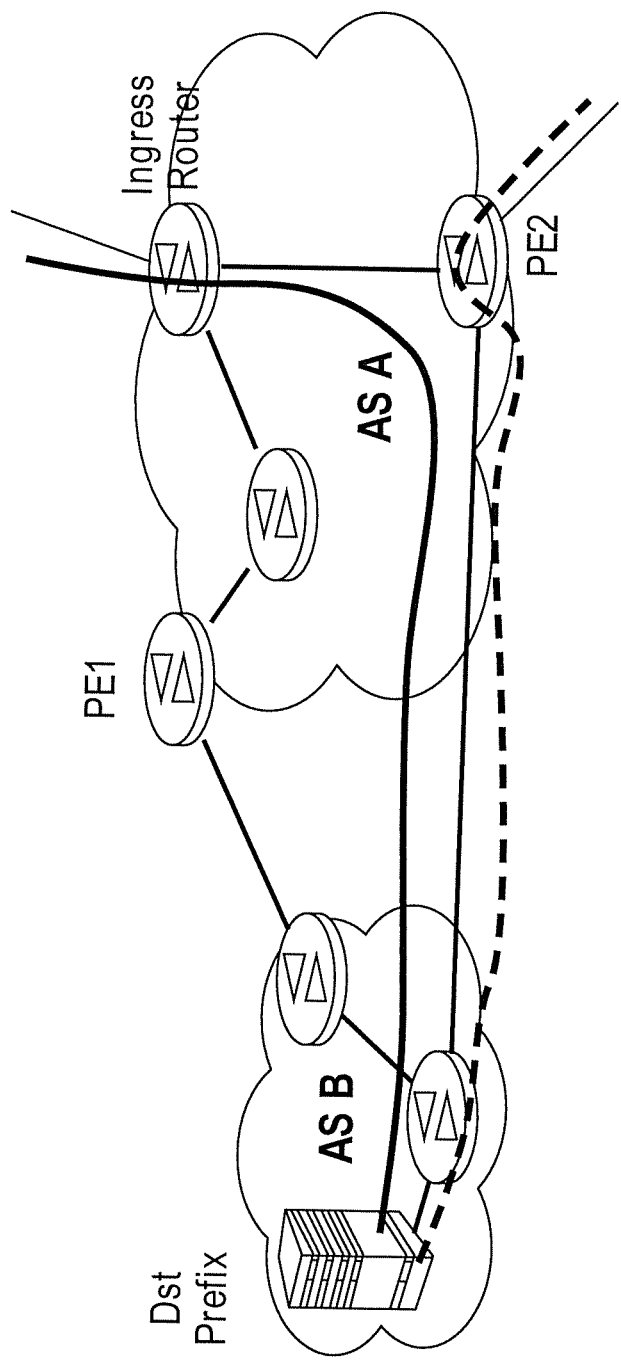
FIGS. 3A and 3B are diagrams illustrating example network configurations illustrating joint intradomain and interdomain routing.
Figure 3B:
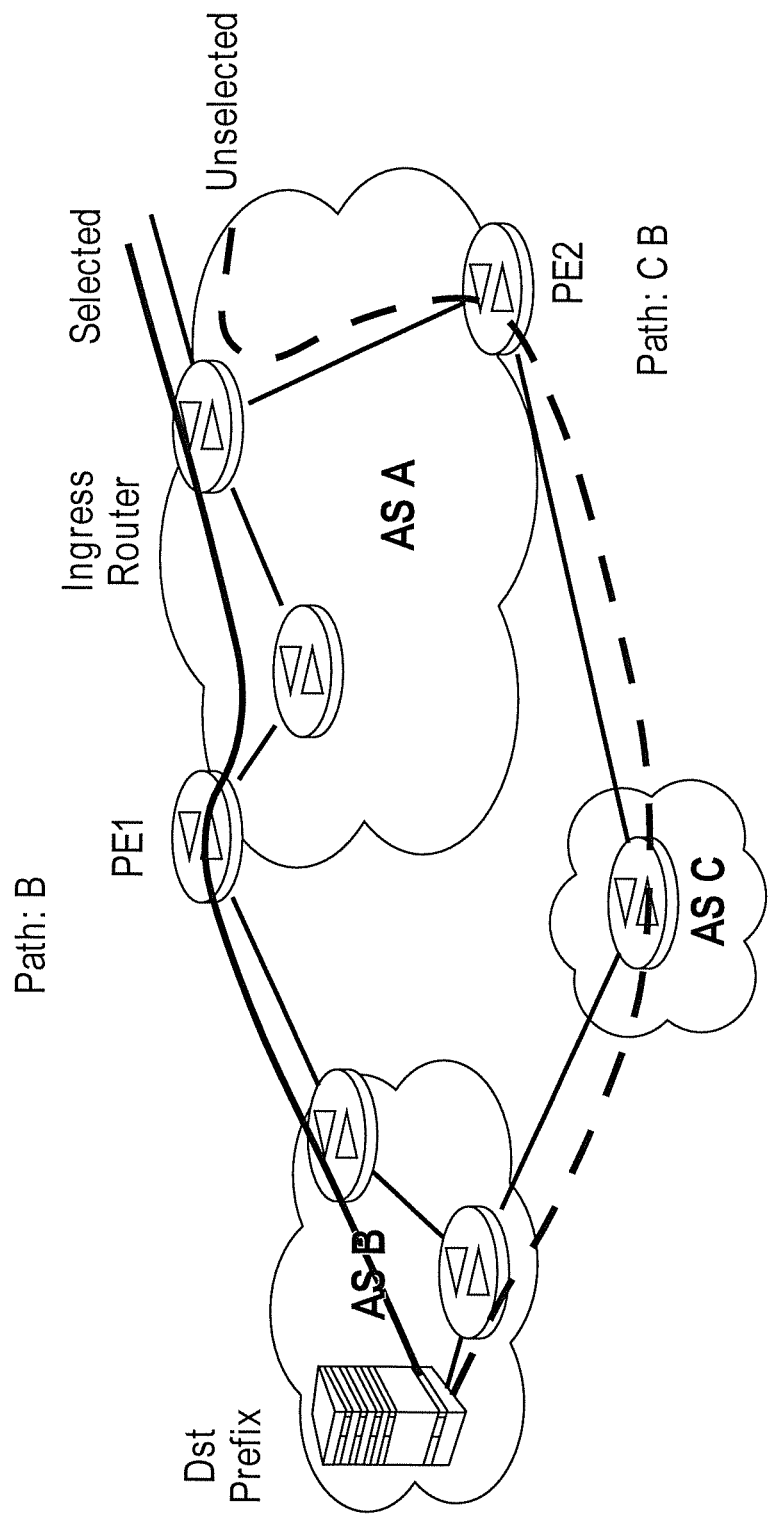

FIGS. 3A and 3B are diagrams illustrating example network configurations illustrating joint intradomain and interdomain routing. These example networks show that considering interdomain and intradomain separately may lead to suboptimal issues in the network. In reference to FIG. 3A, the problem is illustrated where IGP cost is utilized as the sole intradomain factor in the path selection this can cause unbalanced loads in the network. In the example of FIG. 3A, the customer (dst prefix) is multi-homed, but the provider edge routers PE2 and PE1 select customer edge CE2, which occurs due to hot-potato routing. In this case, link CE1-PE1 is not used.

In reference to FIG. 3B, another problem is illustrated where IGP costs considered too late in the process can create path inflation problem. As shown in the example in FIG. 3B, the cost of an AS Path from PE1 is 1 and an AS Path from PE2 is 2. The ingress router selects PE1 using intradomain routing due to shorter length. However, the router level path is shorter for the alternative dotted path through PE2 even though the higher AS level path is shorter.

Joint Representation of Interdomain and Intradomain TE

The embodiments provide a joint representation of interdomain and intradomain TE to overcome the problems illustrated above. The controller of the SDN network performs path selection on behalf of all border routers. The border routers only maintain BGP sessions with other border routers sitting in neighboring networks (e.g., neighboring ISPs). The SDN controller can use a bgp-add path feature to advertise or maintain more than the best route to the destination through border switches.

In the joint representation, the traffic demand representation can be determined without running the full intradomain TE optimization. Although a network (e.g., an ISP) may know the aggregate demand traffic volume of its neighboring networks (e.g., ISPs) through service level agreements (SLAs), the more specific per destination traffic demands are not known. A detailed traffic matrix can be estimated based on past traffic patterns by the SDN controller. The main challenge is that there can be unpredictable traffic spikes where the estimated traffic matrix can potentially lead to congestion. In addition, there can be intradomain scheduled events. For example, a university may ask its ISP to know when the best time is to send inter-campus traffic. The process can assume the SDN controller can 1) build traffic matrix estimates per destination prefix from each border and internal routers, 2) detect spikes, where the SDN controller performs a fine-grained measurement and recomputes paths for traffic spikes to avoid congestion, and 3) receives explicit interfaces from organization or its neighboring ISPs.

The embodiments present ways to create a unified problem statement by bringing the interdomain into the intradomain TE problem. The embodiments include three methods for joint representation of the intradomain and interdomain TE.

Figure 4A:
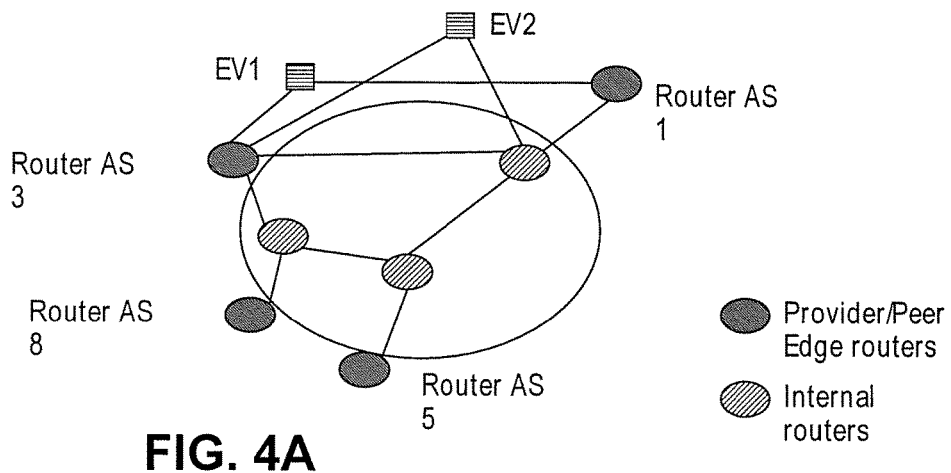
FIG. 4A is a diagram of a reachability based abstraction of a network.

FIG. 4A is a diagram of a reachability based abstraction of a network. A first method is referred to as reachability based abstraction. In this method an external virtual (EV) node represents a cluster of address prefixes having the same set of paths:

EV 1=Prefixes: {p1, p2, p3} →Paths: {<AS 1, AS2, AS4>, <AS3,AS4>}

EV 2=Prefixes: {p4}→Paths: {<AS 1, AS 2, AS 6>, <AS 3, AS 2, A6>}

In the unified topology, an EV is connected to immediate edge routers in the neighboring ASes through virtual links; A virtual link represents an AS path. Each physical link has a known bandwidth/latency. Each virtual link represents an AS path, so it should have the bandwidth and latency of that path. Given inter-EVi demands, we can run TE on the abstract topology. The output of TE is not only bandwidth allocation, but also determines path selection. FIG. 4A is an example of the reachability based abstraction.

Figure 4B:
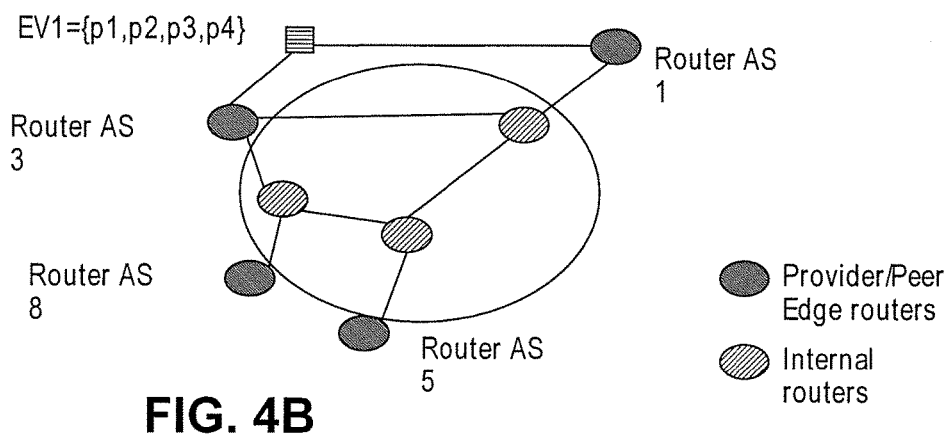
FIG. 4B is a diagram of a second network abstraction referred to as an egress based abstraction.

FIG. 4B is a diagram of a second network abstraction referred to as an egress based abstraction. In this second embodiment, the joint representation is based on what is referred to the egress based abstraction. In this representation, each external virtual node represents all address prefixes with the same next-hop AS. In the previous example in FIG. 4A, there was one group EV1={p1,p2,p3,p4} in the egress based abstraction. In this example, each virtual link now represents more than one path as shown in FIG. 4B.

Figure 4C:
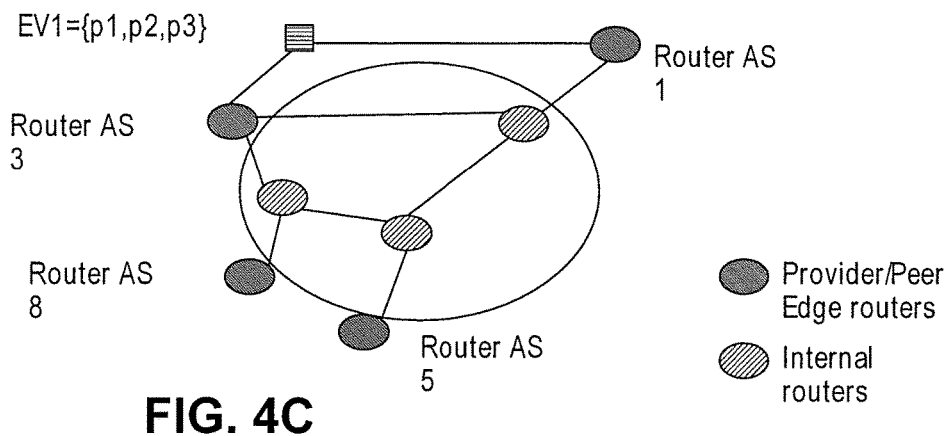
FIG. 4C is a diagram of a third network abstraction referred to as a quality of service (QoS) based abstraction.

FIG. 4C is a diagram of a third network abstraction referred to as a quality of service (QoS) based abstraction. With QoS abstraction, each external virtual node represents all address prefixes with similar a QoS vector [bandwidth, latency] for all paths and the same next-hop ASes. The QoS metrics can be obtained by continuous performance measurement. One such example is:

i. P1={<AS 3, AS 2, A6>}: (2 gbs, 100 ms), <AS1, AS6>: (10 gbs, 150 ms)}
ii. P2={<AS 3, AS 7, A5>}: (3 gbs, 110 ms), <AS1, AS5>: (9 gbs, 150 ms))}
iii. P2={<AS 3, AS 2, A6>}: (2 gbs, 100 ms), <AS1, AS6>: (10 gbs, 150 ms)}

TE Optimization Process

The embodiments focus on general traffic engineering classes. For example, a topology graph G can be G=(V,E) where V is the set of switches or datacenter gateways and E is the set of inter-switch and inter data center (inter-DC) links for intradomain and inter-DC traffic engineering respectively. Then a TE optimization process can be classified as follows in the table below where source-destination Pair=SD pair and objectives refer to optimize cost functions (e.g., max-min fair-share and min-max link utilization):

TABLE I

| Classes | Input/Output/Examples |
| --- | --- |
| Unconstrained Singlepath | Input: the total demand for each SD pair<br>Output: a routing f that contains only a single-path for SD pair |
| Constrained Multipath | Inputs: For each SD-pair, 1) a set of pre-computed candidate paths (e.g., k-shortest paths or k-tunnels over longer paths) and 2) total demand<br>Output: find bandwidth share of each path between each SD pair |
| Unconstrained Multipath | Input: the total demand for each SD pair<br>Output: find k-paths and the bandwidth share of each path for each SD pair |

Due to NP-hardness, the TE optimization process defines a constrained-multipath in the beginning of each epoch. >For each address prefix, the controller selects at most k external paths (AS-level) based different metrics such as: performance (hop counts, latency, and loss), path disjointedness, egress disjointedness, and egress cost/revenue. >For each (ingress router, external path), the controller selects m internal paths (e.g., m-shortest path). This means that each ingress router has at most m*k paths to reach an address prefix. There are some guidelines to statically select paths through defining the "width" for each path.

The extended topological representation is similarly modified. Each neighboring network (e.g., an ISP) is represented as a virtual switch. The representation also groups address prefixes reachable via the same neighboring networks as a virtual switch. The representation assumes links between neighboring networks and prefixes have unlimited bandwidth. With such a representation, it is possible to take a look at a general constrained multipath problem based on this representation.

For example, assume there are S={1,2, . . . S} source destination (SD) pairs and Ps is the paths for SD pair s. Let the total demand for SD pair s be r, and $x_{sp}$ is an amount of traffic from r, along the path p in Ps, then $$\sum_{p \in P_s} x_{sp} = r_s$$

Based on this formulation, let xl be the rate of traffic on link l which is the sum of traversing rates of all source destination pairs:

$$x^l = \sum_{s \in S} \sum_{l \in p, p \in P_s} x_{sp}$$

For each link l, Cl(xl) is the cost as a function of the link flow xl. For example, cost can be the link utilization and link loss. If a goal is to minimize the total cost and the output is the share of each paths of an SD pair or x=(xs, for all s in S) where xs=(xsp, for all p in Ps) based on class 2 definition, then we will have the following formulation. It's important that if we define non-linear cost function per link, then the optimization problem becomes difficult to solve, but for a linear cost function, we will have $$\min_x \sum_l C_l(x^l)$$

$$\text{s.t} \sum_{p \in P_s} x_{sp} = r_s, \text{ forall } s \in S$$

$$x_{sp} \geq 0, \text{ forall } p \in P_s, s \in S$$

After finding optimal rate for each path of each SD pair, the controller implements paths by programming switches and enforce rates using meters. It also pushes/pops bgp_add_path_id at egress/ingress points if necessary. Periodically, the controller updates internal/external paths based on BGP updates and previous TE optimization process results and updates the topology graph and runs TE optimization process again.

TE Formulation with Middlebox Constraints and Different Cost Functions

Best practices confirm performing TE optimization processes on a per single TCP/UDP flow is not scalable. Thus, a scalable TE optimization process should take into account total aggregate flow (flow-group) between source and destination nodes of the input topology graph. In some scenarios, the process can be configured to perform more fine-grained TE optimizations such that a subset of aggregate flows (flow-subgroup) between source and destination nodes is treated in a special manner. For example, the process could be configured to direct a flow subgroup through a sequence of middlebox instances from a source to a destination. In this case, a single set of tunnels cannot carry all flow subgroups, so the process needs to establish a different tunnel-set for each flow subgroup between source and destination nodes.

Thus, the TE optimization process can be reconfigured to consider both middleboxes and different cost functions for peering and non-peering links. This embodiment of the TE optimization algorithm receives for each source-destination pair takes as inputs 1) the explicit bandwidth demand for each middlebox sequence, and 2) for each middlebox sequence, a set of tunnels established between the source and destination nodes. A tunnel goes through a desired sequence of physical middlebox instances (e.g., tunnels can work over k-shortest paths satisfying middlebox constraints).

In this embodiment, the allocated bandwidth on each tunnel for all source-destination pairs and middlebox sequences is generated as output. The defined objective is minimizing link utilization of all links (transit and intradomain links) except peering links. In one example embodiment, the following example variables may be utilized:

Variables:
0) E: set of all links in the topology
1) E': set of peering links
2) $b_e$: capacity of link $e \in E$
3) S: set of source/destination (SD) pairs
4) C: set of different middlebox sequences (e.g., $c_1$=(firewall,dpi), $c_1 \in C$)
5) $T_{s,c}$: set of tunnels for SD pair s that goes through middlebox sequence c
6) $d_{s,c}$: bandwidth demand SD pair s for middlebox sequence c
7) $x_{s,c}^t$: allocated bandwidth to SD pair s for middlebox sequence c through tunnel $t \in T_{s,c}$
8) $\psi(t,e)$: a function that returns 1 if tunnel t contains link e otherwise 0
9) m: maximum link utilization among all links (internal and transit) except peering links
10) n: minimum link utilization among peering links Based on the above variables, the TE optimization process can be formulated as a linear program with five constraints. The objective is to minimize m and maximize n that gives us minimizing m-n through negation. The following is the description for constraints:

0) indicates the allocated rate over each tunnel belonging to an SD pair and middlebox sequence c is equal or bigger than 0.
1) indicates the total rate of tunnels established for a middlebox sequence for an SD pair is equal to the original demand of the SD pair for the middlebox sequence.
2) indicates the total rate of tunnels going through a link is less than the link capacity.
3) indicates the maximum link utilization of non-peering links (m) is larger than the link utilization of each non-peering link.
4) indicates the minimum link utilization (n) of peering links is less than the link capacity of each peering link.

For these computations it is assumed middlebox instances have unlimited capacity for now. However, it is possible toy add any other necessary constraints.

Objective:

$$\min_x m - n$$

Constraints:

0) $\forall s \in S, \forall c \in C, t \in T_{s,c}: x_{s,c}^t \geq 0$

1) $\forall s \in S, c \in C: \sum_{t \in T_{s,c}} x_{s,c}^t = d_{s,c}$

2) $\forall e \in E: \sum_{s \in S} \sum_{c \in C} \sum_{t \in T_{s,c}} x_{s,c}^t \psi(t, e) \leq b_e$ 3) $\forall e \in E - E': m \geq \dfrac{\sum_{s \in S} \sum_{c \in C} \sum_{t \in T_{s,c}} x_{s,c}^t \psi(t, e)}{b_e}$ 4) $\forall e \in E': n \leq \dfrac{\sum_{s \in S} \sum_{c \in C} \sum_{t \in T_{s,c}} x_{s,c}^t \psi(t, e)}{b_e}$ The embodiments further allow different objectives to be implemented in different locations in the network. The TE optimization process considers multiple objectives for our optimization problem. For example, the process can maximize the bandwidth on some links and minimize on the other links. There are two general approaches for doing this. The first approach is to build a weighted sum of different linear objectives as set forth in the above formulation. The other approach is to build a multi-objective linear program that is not straightforward to solve, but there are some solutions for this.

In one embodiment, the recursive/regressive traffic engineering process is utilized to improve the performance of the TE optimization process. In some applications, networks such as ISP wide area networks (WANs) can cover a very large geographical area such as a continent. In the intradomain topology, thousands of data plane devices such as switches and middleboxes are distributed and interconnected. The interdomain topology can be as big as intradomain topologies in terms of links. Interdomain topology consists of peering links between border switches of two neighbor networks (e.g., ISPs). The aggregate interdomain and interdomain topology can be orders of magnitudes larger than inter data center networks where some big data centers are interconnected through a small set of public-facing switches. In such a large network, traffic demands can be between any pair of switches. Computing a TE optimization process on the whole topology is not scalable and fast since an optimal formulation can have a tremendous number of constraints even in a basic formulation. The number of constraints increases as the objective function becomes more complex and accordingly more constraints are added.

In one embodiment, the TE optimization process is not in a single shot, which takes as input the whole topology and the complete demand matrix. Instead, the recursive/regressive process is utilized to leverage parallelism and combine multiple objective functions together. The embodiments present a TE architecture that contains a set of compute threads organized into a tree structure. Each thread can have any number of child threads and a parent thread. The topmost node in the hierarchy is the root thread and the bottommost nodes are leaf threads. From bottom to top, each thread except the root abstracts its network as gigantic switch (G-switch) and exposes this abstraction to its parent thread. Also, each thread runs an instance of the TE process with a specific objective function on top of the abstract topology exposed from its children. Heterogeneous TE objectives allow an operator to manage different types of links and switches depending on the infrastructure cost and traffic patterns among them. For example, in a two level structure, leaf threads can minimize the maximum link utilization within their logical region containing inexpensive links (e.g., a logical region can be a PoP) to avoid congestion while the root thread can maximize the bandwidth allocation across expensive inter-region links to increase the revenue. With this specific design, most of demand changes and data plane states are hidden from thread and non-leaf threads are responsible for engineering aggregate traffic demands.

In a recursive process on a topological abstraction, each thread associates three pieces of information to the G-switch that is exposed to the parent thread: hop count, latency, and bandwidth. These three metrics are computed between each pair of external ports of the logical region of a thread. For each port pair, the process computes k-shortest paths and then builds the metrics as follows:

1) Hop count: compute statistical hop count (e.g., maximum hop count) on the computed paths.

2) Latency: compute statistical latency (e.g., maximum/average latency) of computed paths for each port pair.

3) Bandwidth: the computed paths of different port pairs can share some links. To expose the maximum available bandwidth for each port pair, the process maximizes the aggregate bandwidth allocated to the computed paths of different sets, assuming fairness among these port pairs. The maximum bandwidth per port pairs describes how much the upper level thread can send in terms of data traffic from a port to another in the worst case scenario.

Bottom-UP Demand Delegations: In the hierarchical tree structure, whenever a thread receives an input demand between a source and destination, it first inspects the source and destination. If both the source and destination fall into its logical region by an intra region path, then it adds the demand to its local demand matrix, otherwise it delegates the demand to its parent thread through the G-switch. This procedure filters out non-local demand at each thread. Finally, the root thread will have the global demand between source and destination pairs on its abstract topology, which do not fall into any other low level regions. The following shows a simple code representing the procedure:

```
Func Delegation(Thread T):
  Foreach d in T.demand:
    If d.src not in T.topology or d.dst not in T.topology:
      T.expose(d, T.parent)
      T.D.remove(d)
```

Top-Down Parallel Sequential Traffic Engineering Computations: After demand delegations, each thread runs the traffic engineering with its own specific objective on the links visible to it. The TE optimization process output in each thread is a set of tunnels, each with an allocated bandwidth. In a top to bottom procedure, each thread programs G-switches along the path of a tunnel. For each tunnel, it puts a demand equal to the allocated bandwidth to the tunnel between ingress and egress ports of each G-switch. Once child threads receive demands between the ingress and egress ports of the exposed G-switch, they compute local tunnels between the ingress and egress endpoints based on their local objective function, and follow the same procedure as follows:

```
Func Computation(Thread T):
  tunnels=TECompute(T.topology, T.demand, T.Objs, T.Consts)
  For each t in tunnels:
    For each G-switch gs in t.path:
      gs.PutDemand(gs.inport, gs.output, t.bw)
    For each 1 in T.topology.links:
      link.bw=link.bw-t.bw
  UpdateParentFabric(T.topology)
```

Figure 5:
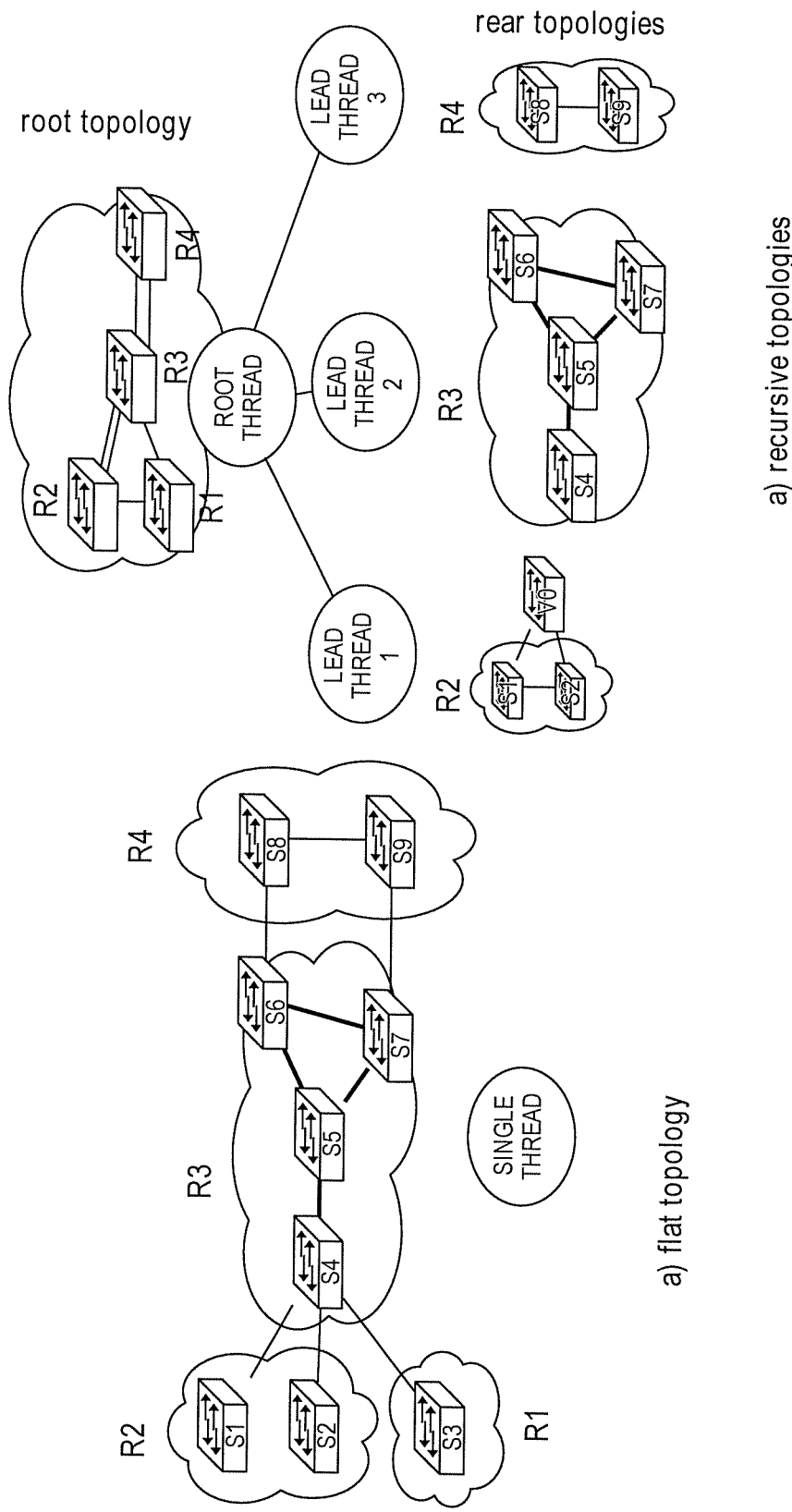
FIG. 5 is a diagram of one embodiment of a network architecture represented as a hierarchical structure for purpose of recursive TE optimization.

FIG. 5 is a diagram of one embodiment of a network architecture represented as a hierarchical structure for purpose of recursive TE optimization. In this illustrated example, a two level design to the hierarchical tree is utilized. The root thread handles the abstract topology exposed from the leaf threads. Each leaf thread is responsible for a portion of the physical topology. In this example, there are three demands on the flat topologies: (S1, S8)=2 and (S2, S9)=3, and (S1, S2)=3. In the example, the root is delegated with demand (R2, R4)=5 that aggregates (S1, S8) and (S2,S9). The process then finds the tunnels on top of its abstract topology based on the global objective function. Then, the process programs G-switches R1, R2, R3, and R4 by configuring these switches for the demands. The underlying threads finally run the traffic engineering within their logical region with their own respective objective function.

As set forth above, the embodiments of the invention provide a new method for SDN based traffic engineering in a network such as a carrier network. The embodiments can be used to jointly consider the intradomain and interdomain path properties, resources, cost, and dynamics. The embodiments allow the operator of a network to flexibly define the optimization demand, for different parts of the network. The TE optimization process of the embodiments also achieves high scalability given the recursive/regressive TE optimization process embodiments. The general mechanism can be applied to any type of network including carrier network, data center network, and enterprise networks.

The operations in the flow diagram below will be described with reference to the exemplary embodiments of the other figures. However, it should be understood that the operations of the flow diagram can be performed by embodiments of the invention other than those discussed with reference to the other figures, and the embodiments of the invention discussed with reference to these other figures can perform operations different than those discussed with reference to the flow diagrams.

Figure 6:
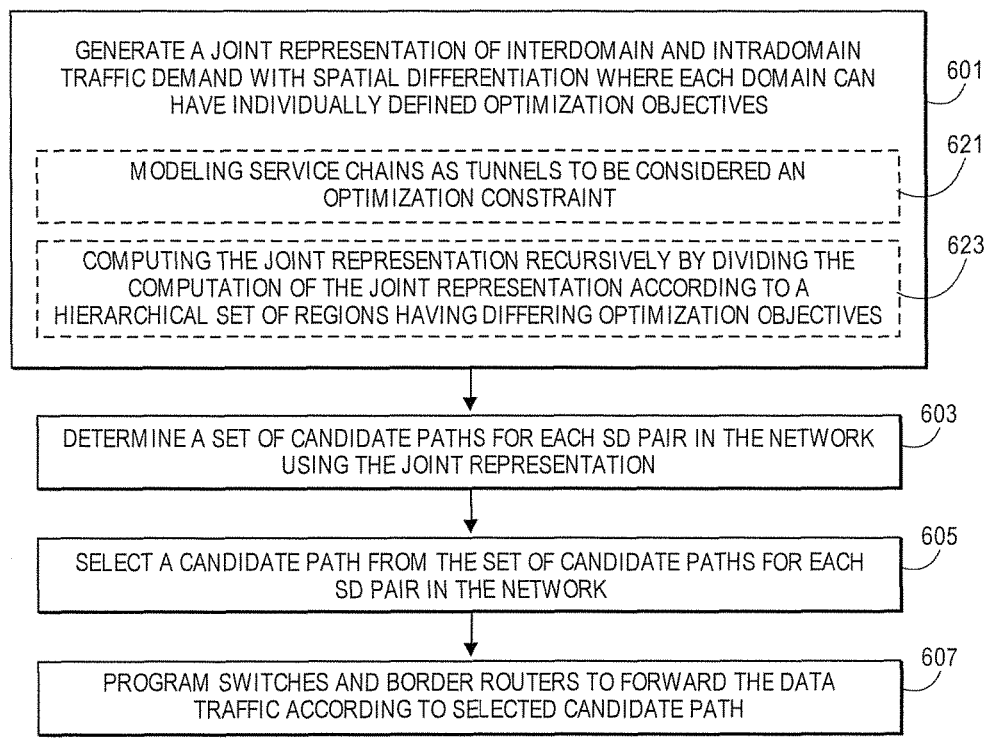
FIG. 6 is a flowchart of an overview of the basic method for the TE optimization process.

FIG. 6 is a flowchart of an overview of the basic method for the TE optimization process. As discussed herein above, the embodiments of the TE optimization process are part of a path finding or routing process for a network, in particular this process is suitable for WANs and similar networks, but may also be applied to data center configurations. The process is a continuous process for path finding and interdomain and intradomain routing and TE optimization. The embodiments as discussed herein are part of this path finding and routing process at the network controller for an SDN network. The controller uses the joint representation of the interdomain and intradomain traffic demand generated by the embodiments to configure improved paths between source and destination pairs as configured in the forwarding information bases of the switches and similar network devices of a network.

Thus, in response to a change in the configuration of the network or the update of topology information received through BGP or similar protocols, the process generates a joint representation of the interdomain and intradomain traffic demand in a given network (Block 601). In some embodiments, the joint representation can include a modeling of service chains as tunnels to be considered as an optimization constraint for the TE optimization process (Block 621) as set forth above in further detail. In further embodiments, the TE optimization process can be broken down into a recursive/regressive computation by dividing the computation of the joint representation according to a hierarchical set of regions having differing optimization objectives (Block 623).

Once the joint representation of the interdomain and intradomain traffic demand has been computed, then the process of determining a set of candidate paths for all source-destination (SD) pairs can be determined in the network using this joint representation (Block 603). From this set of candidate paths, a path for use in data traffic forwarding for each SD pair is selected (Block 605). The selected candidate path can then be programmed into the switches of the SDN (Block 607).

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figures 7A, 7B:
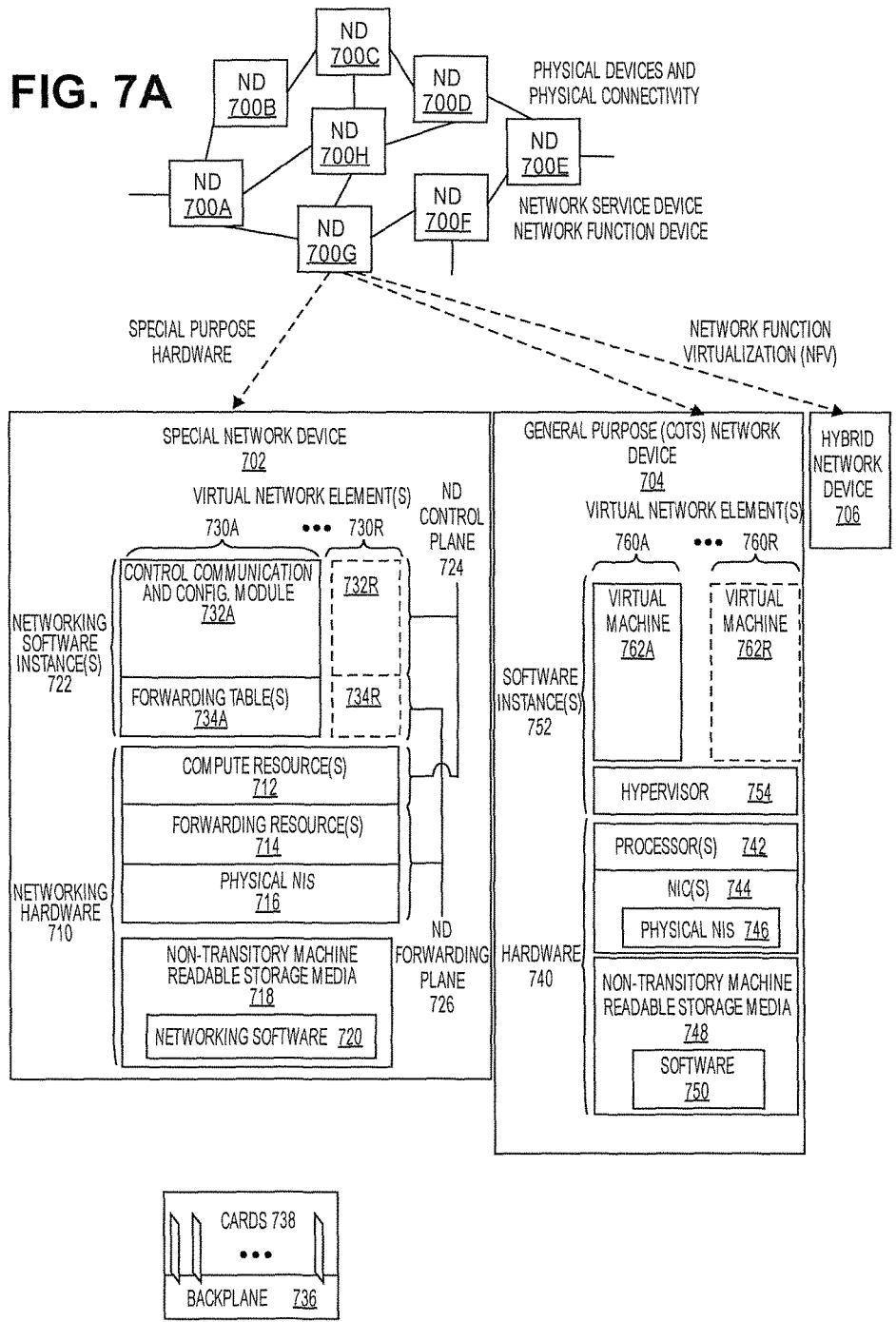
FIG. 7A illustrates connectivity between network devices (NDs) within an exemplary network, as well as three exemplary implementations of the NDs, according to some embodiments of the invention.
FIG. 7B illustrates an exemplary way to implement a special-purpose network device according to some embodiments of the invention.

FIG. 7A illustrates connectivity between network devices (NDs) within an exemplary network, as well as three exemplary implementations of the NDs, according to some embodiments of the invention. FIG. 7A shows NDs 700A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 700A, E, and F illustrates that these NDs act as ingress and egress points for the network (and thus, these NDs are sometimes referred to as edge NDs; while the other NDs may be called core NDs).

Two of the exemplary ND implementations in FIG. 7A are: 1) a special-purpose network device 702 that uses custom application-specific integrated-circuits (ASICs) and a proprietary operating system (OS); and 2) a general purpose network device 704 that uses common off-the-shelf (COTS) processors and a standard OS.

The special-purpose network device 702 includes networking hardware 710 comprising compute resource(s) 712 (which typically include a set of one or more processors), forwarding resource(s) 714 (which typically include one or more ASICs and/or network processors), and physical network interfaces (NIs) 716 (sometimes called physical ports), as well as non-transitory machine readable storage media 718 having stored therein networking software 720. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 700A-H. During operation, the networking software 720 may be executed by the networking hardware 710 to instantiate a set of one or more networking software instance(s) 722. Each of the networking software instance(s) 722, and that part of the networking hardware 710 that executes that network software instance (be it hardware dedicated to that networking software instance and/or time slices of hardware temporally shared by that networking software instance with others of the networking software instance(s) 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A).

The special-purpose network device 702 is often physically and/or logically considered to include: 1) a ND control plane 724 (sometimes referred to as a control plane) comprising the compute resource(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the compute resource(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R.

FIG. 7B illustrates an exemplary way to implement the special-purpose network device 702 according to some embodiments of the invention. FIG. 7B shows a special-purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general purpose network device 704 includes hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein software 750. During operation, the processor(s) 742 execute the software 750 to instantiate one or more sets of one or more applications 764A-R. While one embodiment does not implement virtualization, alternative embodiments may use different forms of virtualization represented by a virtualization layer 754 and software containers 762A-R. For example, one such alternative embodiment implements operating system-level virtualization, in which case the virtualization layer 754 represents the kernel of an operating system (or a shim executing on a base operating system) that allows for the creation of multiple software containers 762A-R that may each be used to execute one of the sets of applications 764A-R. In this embodiment, the multiple software containers 762A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 754 represents a hypervisor (sometimes referred to as a virtual machine monitor (VMM)) or a hypervisor executing on top of a host operating system; and 2) the software containers 762A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 764A-R, as well as the virtualization layer 754 and software containers 762A-R if implemented, are collectively referred to as software instance(s) 752. Each set of applications 764A-R, corresponding software container 762A-R if implemented, and that part of the hardware 740 that executes them (be it hardware dedicated to that execution and/or time slices of hardware temporally shared by software containers 762A-R), forms a separate virtual network element(s) 760A-R.

The virtual network element(s) 760A-R perform similar functionality to the virtual network element(s) 730A-R—e.g., similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 762A-R differently. For example, while embodiments of the invention are illustrated with each software container 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 762A-R to VNEs also apply to embodiments where such a finer level of granularity is used.

In certain embodiments, the virtualization layer 754 includes a virtual switch that provides similar forwarding services as a physical Ethernet switch. Specifically, this virtual switch forwards traffic between software containers 762A-R and the NIC(s) 744, as well as optionally between the software containers 762A-R; in addition, this virtual switch may enforce network isolation between the VNEs 760A-R that by policy are not permitted to communicate with each other (e.g., by honoring virtual local area networks (VLANs)).

The third exemplary ND implementation in FIG. 7A is a hybrid network device 706, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

FIG. 7C illustrates various exemplary ways in which VNEs may be coupled according to some embodiments of the invention. FIG. 7C shows VNEs 770A.1-770A.P (and optionally VNEs 770A.Q-770A.R) implemented in ND 700A and VNE 770H.1 in ND 700H. In FIG. 7C, VNEs 770A.1-P are separate from each other in the sense that they can receive packets from outside ND 700A and forward packets outside of ND 700A; VNE 770A.1 is coupled with VNE 770H.1, and thus they communicate packets between their respective NDs; VNE 770A.2-770A.3 may optionally forward packets between themselves without forwarding them outside of the ND 700A; and VNE 770A.P may optionally be the first in a chain of VNEs that includes VNE 770A.Q followed by VNE 770A.R (this is sometimes referred to as dynamic service chaining, where each of the VNEs in the series of VNEs provides a different service—e.g., one or more layer 4-7 network services). While FIG. 7C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 7A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 7A may also host one or more such servers (e.g., in the case of the general purpose network device 704, one or more of the software containers 762A-R may operate as servers; the same would be true for the hybrid network device 706; in the case of the special-purpose network device 702, one or more such servers could also be run on a virtualization layer executed by the compute resource(s) 712); in which case the servers are said to be co-located with the VNEs of that ND.

A virtual network is a logical abstraction of a physical network (such as that in FIG. 7A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 7D illustrates a network with a single network element on each of the NDs of FIG. 7A, and within this straight forward approach contrasts a traditional distributed approach (commonly used by traditional routers) with a centralized approach for maintaining reachability and forwarding information (also called network control), according to some embodiments of the invention. Specifically, FIG. 7D illustrates network elements (NEs) 770A-H with the same connectivity as the NDs 700A-H of FIG. 7A.

FIG. 7D illustrates that the distributed approach 772 distributes responsibility for generating the reachability and forwarding information across the NEs 770A-H; in other words, the process of neighbor discovery and topology discovery is distributed.

For example, where the special-purpose network device 702 is used, the control communication and configuration module(s) 732A-R of the ND control plane 724 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 770A-H (e.g., the compute resource(s) 712 executing the control communication and configuration module(s) 732A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 724. The ND control plane 724 programs the ND forwarding plane 726 with information (e.g., adjacency and route information) based on the routing structure(s). For example, the ND control plane 724 programs the adjacency and route information into one or more forwarding table(s) 734A-R (e.g., Forwarding Information Base (FIB), Label Forwarding Information Base (LFIB), and one or more adjacency structures) on the ND forwarding plane 726. For layer 2 forwarding, the ND can store one or more bridging tables that are used to forward data based on the layer 2 information in that data. While the above example uses the special-purpose network device 702, the same distributed approach 772 can be implemented on the general purpose network device 704 and the hybrid network device 706.

FIG. 7D illustrates that a centralized approach 774 (also known as software defined networking (SDN)) that decouples the system that makes decisions about where traffic is sent from the underlying systems that forwards traffic to the selected destination. The illustrated centralized approach 774 has the responsibility for the generation of reachability and forwarding information in a centralized control plane 776 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane 780 over the south bound interface 782 (which may use the OpenFlow protocol). Thus, the network intelligence is centralized in the centralized control plane 776 executing on electronic devices that are typically separate from the NDs. Leveraging this centralized intelligence can include the implementation of traffic engineering (TE) as described herein above. The TE optimization process described herein above can be implemented as a TE optimization module 781. The TE optimization module 781 is illustrated as being implemented as a single component of the control plane that is implemented by a control plane device. However, one skilled in the art would understand that the TE optimization process can be distributed over multiple control plane devices and multiple functional modules.

For example, where the special-purpose network device 702 is used in the data plane 780, each of the control communication and configuration module(s) 732A-R of the ND control plane 724 typically include a control agent that provides the VNE side of the south bound interface 782. In this case, the ND control plane 724 (the compute resource(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments of the invention, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach).

While the above example uses the special-purpose network device 702, the same centralized approach 774 can be implemented with the general purpose network device 704 (e.g., each of the VNE 760A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments of the invention, the VNEs 760A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general purpose network device 704 or hybrid network device 706 implementations as NFV is able to support SDN by providing an infrastructure upon which the SDN software can be run, and NFV and SDN both aim to make use of commodity server hardware and physical switches.

FIG. 7D also shows that the centralized control plane 776 has a north bound interface 784 to an application layer 786, in which resides application(s) 788. The centralized control plane 776 has the ability to form virtual networks 792 (sometimes referred to as a logical forwarding plane, network services, or overlay networks (with the NEs 770A-H of the data plane 780 being the underlay network)) for the application(s) 788. Thus, the centralized control plane 776 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 7D shows the distributed approach 772 separate from the centralized approach 774, the effort of network control may be distributed differently or the two combined in certain embodiments of the invention. For example: 1) embodiments may generally use the centralized approach (SDN) 774, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 774, but may also be considered a hybrid approach.

While FIG. 7D illustrates the simple case where each of the NDs 700A-H implements a single NE 770A-H, it should be understood that the network control approaches described with reference to FIG. 7D also work for networks where one or more of the NDs 700A-H implement multiple VNEs (e.g., VNEs 730A-R, VNEs 760A-R, those in the hybrid network device 706). Alternatively or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual network(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

On the other hand, FIGS. 7E and 7F respectively illustrate exemplary abstractions of NEs and VNEs that the network controller 778 may present as part of different ones of the virtual networks 792. FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 7701 in one of the virtual network(s) 792 of FIG. 7D, according to some embodiments of the invention. FIG. 7E shows that in this virtual network, the NE 7701 is coupled to NE 770D and 770F, which are both still coupled to NE 770E.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments of the invention. Thus, the abstraction of a NE or VNE can span multiple NDs.

While some embodiments of the invention implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Figure 8:
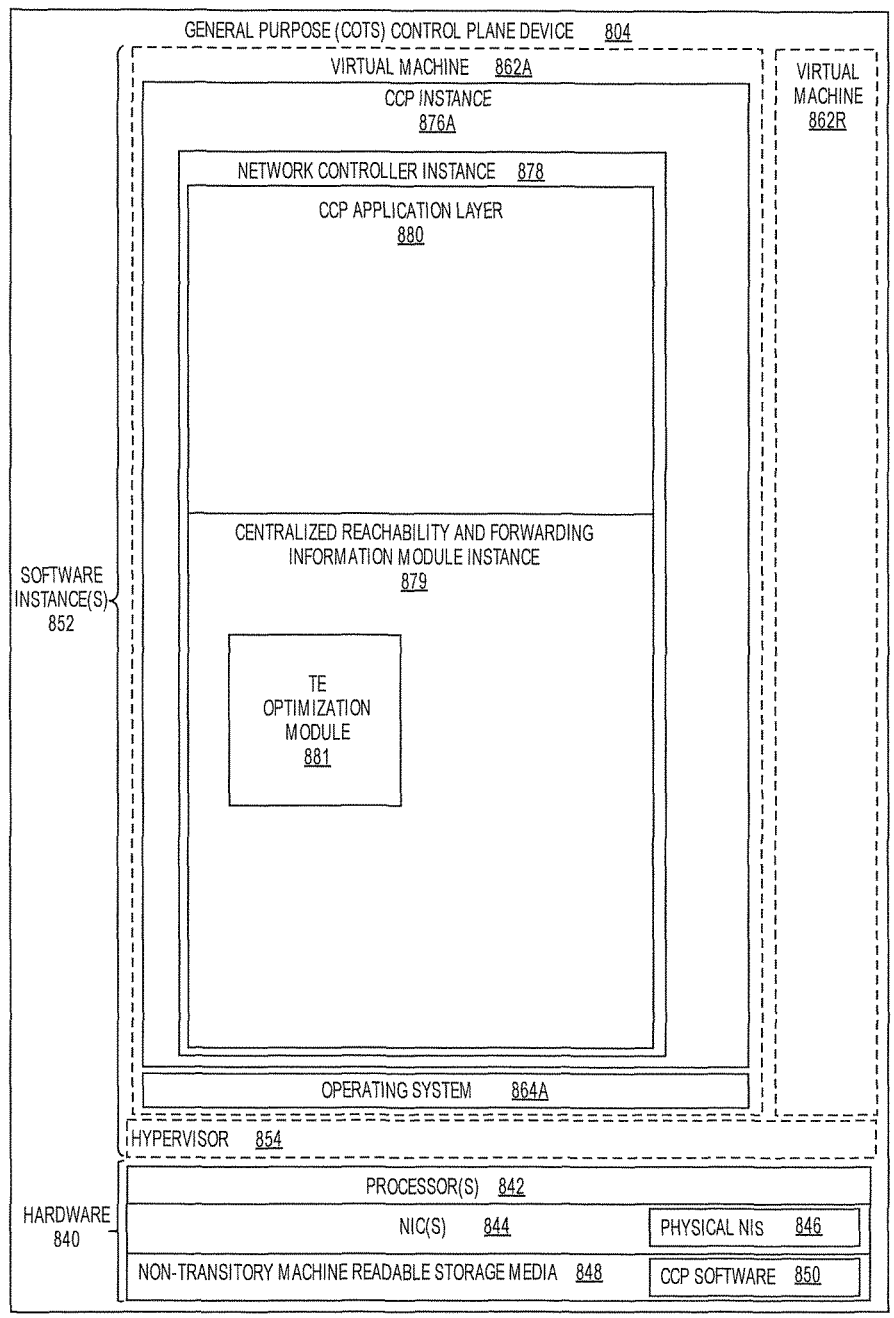
FIG. 8 illustrates a general purpose control plane device with centralized control plane (CCP) software 750, according to some embodiments of the invention.

Similar to the network device implementations, the electronic device(s) running the centralized control plane 776, and thus the network controller 778 including the centralized reachability and forwarding information module 779, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 8 illustrates, a general purpose control plane device 804 including hardware 840 comprising a set of one or more processor(s) 842 (which are often COTS processors) and network interface controller(s) 844 (NICs; also known as network interface cards) (which include physical NIs 846), as well as non-transitory machine readable storage media 848 having stored therein centralized control plane (CCP) software 850.

In embodiments that use compute virtualization, the processor(s) 842 typically execute software to instantiate a virtualization layer 854 and software container(s) 862A-R (e.g., with operating system-level virtualization, the virtualization layer 854 represents the kernel of an operating system (or a shim executing on a base operating system) that allows for the creation of multiple software containers 862A-R (representing separate user space instances and also called virtualization engines, virtual private servers, or jails) that may each be used to execute a set of one or more applications; with full virtualization, the virtualization layer 854 represents a hypervisor (sometimes referred to as a virtual machine monitor (VMM)) or a hypervisor executing on top of a host operating system, and the software containers 862A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 850 (illustrated as CCP instance 876A) is executed within the software container 862A on the virtualization layer 854. In embodiments where compute virtualization is not used, the CCP instance 876A on top of a host operating system is executed on the "bare metal" general purpose control plane device 804. The instantiation of the CCP instance 876A, as well as the virtualization layer 854 and software containers 862A-R if implemented, are collectively referred to as software instance(s) 852.

In some embodiments, the CCP instance 876A includes a network controller instance 878. The network controller instance 878 includes a centralized reachability and forwarding information module instance 879 (which is a middleware layer providing the context of the network controller 778 to the operating system and communicating with the various NEs), and an CCP application layer 880 (sometimes referred to as an application layer) over the middleware layer (providing the intelligence required for various network operations such as protocols, network situational awareness, and user-interfaces). At a more abstract level, this CCP application layer 880 within the centralized control plane 776 works with virtual network view(s) (logical view(s) of the network) and the middleware layer provides the conversion from the virtual networks to the physical view. In some embodiments, the centralized reachability and forwarding module 879 can further include the TE optimization module 881 that implements the embodiments of the TE optimization process described herein.

The centralized control plane 776 transmits relevant messages to the data plane 780 based on CCP application layer 880 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 780 may receive different messages, and thus different forwarding information. The data plane 780 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 780, the packet (or a subset of the packet header and content) is typically forwarded to the centralized control plane 776. The centralized control plane 776 will then program forwarding table entries into the data plane 780 to accommodate packets belonging to the flow of the unknown packet. Once a specific forwarding table entry has been programmed into the data plane 780 by the centralized control plane 776, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path— multiple equal cost next hops), some additional criteria is used—for instance, in a connectionless network, Equal Cost Multi Path (ECMP) (also known as Equal Cost Multi Pathing, multipath forwarding and IP multipath) (RFC 2991 and 2992) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a centralized control plane device for a software defined networking (SDN) network, the method to perform joint interdomain and intradomain traffic engineering as a single optimization process with location varying objectives, the method comprising the steps of:
generating a joint representation of interdomain and intradomain traffic demand with spatial differentiation where each domain can have individually defined optimization objectives, where interdomain traffic demand in the joint representation includes border gateway protocol updates from edge routers in the SDN;
determining a set of candidate paths for each source-destination pairs (SD) in the SDN network using the joint representation;
selecting a candidate path from the set of candidate paths for each SD pair in the SDN network; and
programming a set of switches in the data plane of the SDN network to forward the data traffic according to the selected candidate path.

2. The method of claim 1, further comprising the step of:
modeling service chains as tunnels to be considered as an optimization constraint in the joint representation.

3. The method of claim 1, further comprising the step of:
computing the joint representation recursively by dividing computations of the joint representation according to a hierarchical set of regions of the network.

4. The method of claim 3, wherein each region of the hierarchical set of regions has a different optimization objective.

5. The method of claim 1, wherein the joint representation is constructed using any one of a reachability based abstraction, an egress based abstraction or a quality of service based abstraction.

6. A control plane device for a software defined networking (SDN) network, the control plane device configured to execute a method to perform joint interdomain and intradomain traffic engineering as a single optimization process with location varying objectives, the control plane device comprising:
a non-transitory machine readable medium having stored therein a traffic engineering (TE) optimization module; and
a processor communicatively coupled to the non-transitory machine readable medium, the processor configured to execute the TE optimization module, the TE optimization module configure to generate a joint representation of interdomain and intradomain traffic demand with spatial differentiation where each domain can have individually defined optimization objectives, where interdomain traffic demand in the joint representation includes border gateway protocol updates from edge routers in the SDN, to determine a set of candidate paths for each source-destination pairs (SD) in the SDN network using the joint representation, to select a candidate path from the set of candidate paths for each SD pair in the SDN network, and to program a set of switches in the data plane of the SDN network to forward the data traffic according to the selected candidate path.

7. The control plane device of claim 6, wherein the TE optimization module is further configured to model service chains as tunnels to be considered as an optimization constraint in the joint representation.

8. The control plane device of claim 7, wherein the TE optimization module is further configured to compute the joint representation recursively by dividing computations of the joint representation according to a hierarchical set of regions of the network.

9. The control plane device of claim 8, wherein each region of the hierarchical set of regions has a different optimization objective.

10. The control plane device of claim 6, wherein the joint representation is constructed using any one of a reachability based abstraction, an egress based abstraction or a quality of service based abstraction.

11. A computing device for a software defined networking (SDN) network, the computing device configured to execute a plurality of virtual machines, at least one of the plurality of virtual machines to implement a method to perform joint interdomain and intradomain traffic engineering as a single optimization process with location varying objectives, the computing device comprising:
a non-transitory machine readable medium having stored therein a traffic engineering (TE) optimization module; and
a processor communicatively coupled to the non-transitory machine readable medium, the processor configured to execute the at least one virtual machine, the at least one virtual machine to implement the TE optimization module, the TE optimization module configure to generate a joint representation of interdomain and intradomain traffic demand with spatial differentiation where each domain can have individually defined optimization objectives, where interdomain traffic demand in the joint representation includes border gateway protocol updates from edge routers in the SDN, to determine a set of candidate paths for each source-destination pairs (SD) in the SDN network using the joint representation, to select a candidate path from the set of candidate paths for each SD pair in the SDN network, and to program a set of switches in the data plane of the SDN network to forward the data traffic according to the selected candidate path.

12. The computing device of claim 11, wherein the TE optimization module is further configured to model service chains as tunnels to be considered as an optimization constraint in the joint representation.

13. The computing device of claim 11, wherein the TE optimization module is further configured to compute the joint representation recursively by dividing computations of the joint representation according to a hierarchical set of regions of the network.

14. The computing device of claim 13, wherein each region of the hierarchical set of regions has a different optimization objective.

15. The computing device of claim 11, wherein the joint representation is constructed using any one of a reachability based abstraction, an egress based abstraction or a quality of service based abstraction.

* * * * *